United States Patent [19]

Nagai et al.

[11] 3,910,980

[45] Oct. 7, 1975

[54] PROCESS FOR PREPARING MONOSILANES FROM POLYSILANES

[75] Inventors: Yoichiro Nagai; Iwao Ojima; Shinichi Inaba, all of Sagamihara, Japan

[73] Assignee: (Zaidanhojin) Sagami Chemical Research Center, Tokyo, Japan

[22] Filed: Feb. 25, 1974

[21] Appl. No.: 445,651

[30] Foreign Application Priority Data
Feb. 28, 1973 Japan.............................. 48-23151
Mar. 14, 1973 Japan.............................. 48-28984

[52] U.S. Cl..... 260/448.8 R; 260/448.2 E; 252/431
[51] Int. Cl................................................ C07f 7/18
[58] Field of Search ............... 260/448.8 R, 448.2 E

[56] References Cited
UNITED STATES PATENTS
3,478,078  11/1969  Atwell.......................... 260/448.8 R
3,576,035  4/1971   Atwell.......................... 260/448.8 R

*Primary Examiner*—Paul F. Shaver
*Attorney, Agent, or Firm*—Oblon, Fisher, Spivak, McClelland & Maier

[57] ABSTRACT

Monosilanes are prepared from polysilanes by reacting the polysilane with an alcohol in the presence of a catalytic amount of a rhodium complex.

17 Claims, No Drawings

PROCESS FOR PREPARING MONOSILANES FROM POLYSILANES

BACKGROUND OF THE INVENTION

Field of the Invention

This invention relates to a process for preparing a monosilane by cracking a polysilane.

Description of the Prior Art

Heretofore, processes for cracking polysilanes have been reported. Also, it is known to prepare alkoxysilanes by reacting a polysilane with an alcohol as disclosed in U.S. Pat. No. 3,576,035, wherein palladium-on-charcoal has been used as the catalyst. The resulting product is an alkyl and/or alkoxy silane which does not have a hydrogen atom directly bonded to the silicon atom. By using the process of U.S. Pat. No. 3,576,035, it is difficult to obtain a hydrosilane which is of high value.

In proportion to the development of the silicon resin industry, the production of dimethyldichlorosilane has reached about 20,000 tons per year by using the direct method of Rochow. The production of dimethyldichlorosilane has been increasing each year. The compounds having a high boiling point which are produced as a by-product in the preparation of dimethyldichlorosilane, are called "a residue." The production of the by-product or residue is about 10% of the total product, i.e., about 2,000 tons.

The residue includes mainly polysilanes such as disilane, trisilane, tetrasilane. It is a waste product which has been discarded by dumping in the ocean at a cost of about 20,000 yen per ton. However, because of the pollution problems caused by this method of disposal, it has been prohibited. However, no effective treatment for the residue has been found so that these residues have been stored at the factories. Because of the prohibition against using PCB, the demand for silicon resins has substantially increased. Thus, a shortage of silicon resins has developed in the silicon resin industry. Accordingly, the production of silicon resins has increased, and, as a result, the problems associated with storage of the residues has increased.

The silicon residue including all the by-products is corrosive, which has resulted in the accidental explosion of some of the storage drums after a certain period of storage. This, of course, has resulted in a new source of pollution.

A need, therefore, continues to exist for a method (s) for effectively converting the waste polysilanes, which are the principal components of the residues, to useful products.

SUMMARY OF THE INVENTION

Accordingly, one object of this invention is to provide a process for preparing monosilanes from the polysilane by-products of the residues from the manufacture of silicon resins.

Another object of the invention is to effectively utilize the polysilane residues, such as disilanes, trisilanes and tetrasilanes.

Briefly, these objects and other objects of the invention as hereinafter will become more readily apparent can be attained for a process of preparing a monosilane from a polysilane by reacting the polysilane with an alcohol in the presence of a rhodium complex.

DETAILED DESCRIPTION OF THE PREFERRED EMBODIMENTS

The rhodium complexes which are used as the catalyst in the reaction of the invention include rhodium complexes containing coordinated phosphine ligands such as tris (triphenylphosphine) chlororhodium, tris (trialkylphosphine) chlororhodium, tris (triarylphosphine) chlororhodium, tris (dialkylarylphosphine) chlororhodium, and tris (alkyldiarlyphosphine) chlororhodium; rhodium complexes coordinated with phosphite ligands such as tris (trialkylphosphite) chlororhodium, and tris (triarlyphosphite) chlororhodium; rhodium complexes coordinated with aminophosphine ligands such as tris (dialkylaminophosphine) chlororhodium; rhodium complexes coordinated with a carbonyl ligand and a phosphine or phosphite ligand such as bis (triarylphosphine) carbonylchlororhodium, bis (trialkylphosphine) carbonylchlororhodium, and bis (trialkylphosphite) carbonylchlororhodium; and rhodium complexes coordinated with olefins or dienes such as tetraethylenedichlorodirhodium and bis (cyclooctadiene) dichlorodirhodium; and also dichlorodicarbonyldirhodium and the like.

These rhodium complexes have been found to be effective for cracking polysilanes such as disilane, trisilane, tetrasilane, and the like. The polysilanes used in the invention can be shown by the following formula:

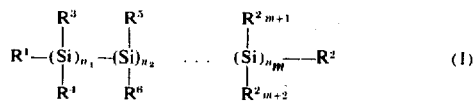

$$R^1-(\underset{R^4}{\overset{R^3}{Si}})_{n_1}-(\underset{R^6}{\overset{R^5}{Si}})_{n_2}\ldots(\underset{R^{2m+2}}{\overset{R^{2m+1}}{Si}})_{n_m}-R^2 \qquad (I)$$

wherein all of the R groups are the same or different and represent hydrogen atoms, alkyl groups, alkenyl groups, aralkyl groups, aryl groups, silyl groups and alkoxy groups which can be bonded to the silicon atom of the silyl compound, $n_m$ is an integer and $m$ is a natural number wherein the sum of $n_1 \ldots n_m$ is at least 2. Representative polysilanes include tetramethyldisilane, trimethyltriphenyltrisilane, hexamethyltrisilane, pentamethyldisilane, bis (trimethylsilyl) methylmonohydrosilane.

In the process of the invention, the polysilanes having formula (I) can be easily cracked to monosilanes such as alkoxysilanes. The polysilanes having the formula (I) wherein $n$ is 2 – 4 are present in the residue from the reaction for the preparation of dimethyldichlorosilane as the chlorides of the polysilanes. The chlorides of the polysilanes can be converted to polysilane raw material of the invention by conventional hydrogenation techniques.

Alcohols which are used in the invention include aliphatic alcohols such as methanol, ethanol, allyl alcohol; aralkyl alcohols such as benzylalcohol; and aromatic alcohols such as phenol. It is preferable to use methanol, ethanol or phenol from the viewpoint of the availability of the alcohol and the utility of the monosilanes.

The monosilanes which have methyl, ethyl or phenyl groups bonded to the silicon atom are especially useful as monomers for the organosilicon resins.

In the cracking reaction of the polysilane in the presence of the alcohol to produce the monosilane, when an excess of the alcohol is used, a dialkoxy (or diaryloxy) silane is usually produced as the main product. When an equivalent amount of the alcohol to the silicon atom is used, a monoalkoxy (or monoaryloxy) silane is usually produced as the main product. The monoalkoxy (or monoaryloxy) silane can then be easily converted to a dialkoxysilane as disclosed in Japanese Pat. application No. 84094/1972 (U.S. Ser. No. 389,133 filed Aug. 17, 1974, to Yoichiro Nagai, et al., for which a Notice of Allowance was issued May 15, 1974).

The amount of the rhodium complex used in catalytically effective amounts ranges from 0.01 – 1.0 mole %.

In the process of the invention, the cracking reaction can be smoothly performed by adding the rhodium complex catalyst to a stirred mixture of the polysilane and the alcohol at room temperature or at a higher temperature. Suitable upper temperature limits are the boiling points of the particular alcohols used. Accordingly, the operation is quite simple and economical, and the desired monosilane can be obtained in high yield. The by-product of the reaction is only hydrogen. The hydrogen evolved can be used for the hydrogenation of the residue if desired, which is also an advantageous industrial operation.

Having generally described the invention, a further understanding can be obtained by reference to certain specific examples which are provided for purposes of illustration only and are not intended to be limiting unless otherwise specified.

EXAMPLE 1

A. A mixture of 12 g (0.1 mole) of symmetrical tetramethyldisilane and 6.4 g (0.2 mole) of methanol was admixed with 90 mg (0.0001 mole; 0.1 mole %) of tris (triphenylphosphine) chlororhodium in a reactor equipped with a condenser cooled with dry ice. The mixture was stirred and reacted at room temperature. The reaction product was distilled whereby 17.0 g of dimethylmethoxysilane having a boiling point of 36°C were obtained. The yield was 95%.

B. The same amount of the mixture of raw materials as in (A) was admixed with the residual material (containing the catalyst) of (A) and the mixture was stirred and distilled under the same conditions whereby 16.5 g of dimethylmethoxysilane (yield 92%) were obtained.

EXAMPLE 2

A mixture of 12 g (0.1 mole) of symmetrical tetramethyldisilane and 16 g (0.5 mole) of methanol was admixed with 90mg (0.001 mole; 0.1 mole %) of tris (triphenylphosphine) chlororhodium in the reactor of Example 1. The mixture was stirred and reacted at room temperature for 3 hours. The reaction product was distilled whereby 22.3 g of dimethyldimethoxysilane having a boiling point of 80.5°C were obtained. The yield was 93%.

EXAMPLE 3

A mixture of 18 g (0.05 mole) of 1,2,3-trimethyl-1,2,3-triphenyltrisilane and 4.8 g (0.15 mole) of methanol was admixed with 45 mg (0.00005 mole; 0.1 mole %) of tris (triphenylphosphine) chlororhodium. The mixture was heated on a water bath at 50°C and reacted for 3 hours. The reaction mixture was distilled whereby 21.7 g of phenylmethoxysilane having a boiling point of 81°C/11 mmHg were obtained. The yield was 95%.

EXAMPLE 4

A mixture of 17.6 g (0.1 mole) of 1,1,2,2,3,3-hexamethyltrisilane, 18.0 (0.3 mole) of isopropyl alcohol and 90 mg (0.0001 mole; 0.1 mole%) of tris (triphenylphosphine) chlororhodium was stirred at room temperature for 2 hours in the reactor of Example 1. The reaction product was distilled whereby 33.3 g of dimethylisopropoxysilane having a boiling point of 62°C were obtained. The yield was 94%.

EXAMPLE 5

A mixture of 17.6 g (0.1 mole) of 1,1,2,2,3,3-hexamethyltrisilane, 28.2 g (0.3 mole) of phenol and 90 mg (0.0001 mole; 0.1 mole %) of tris (triphenylphosphine) chlororhodium, was stirred at 30°C for 30 minutes in the reactor of Example 1. The reaction product was distilled whereby 43.8 g of dimethylphenoxysilane having a boiling point of 73.5°C (32 mmHg) were obtained. The yield was 96%.

EXAMPLE 6

A mixture of 13.2 g (0.1 mole) of pentamethyldisilane and 9.2 g (0.2 mole) of ethanol was admixed with 90 mg (0.0001 mole; 0.1 mole %) of tris (triphenylphosphine)chlororhodium. The mixture was stirred at room temperature for 2 hours in the reactor of Example 1. The reaction products were distilled whereby 10.1 g of dimethylethoxysilane having a boiling point of 51°C (yield 97%) and 10.7 g of trimethylethoxysilane (yield 91%) were obtained.

EXAMPLE 7

A mixture of 17.6 g (0.1 mole) of 1,1,2,2,3,3-hexamethyltrisilane, 32 g (1 mole) of methanol and 90 mg (0.0001 mole; 0.1 mole %) of tris (triphenylphosphine) chlororhodium was stirred at room temperature for 2 hours in the reactor of Example 1. The reaction mixture was distilled whereby 35.3 g of dimethyldimethoxysilane having a boiling point of 81°C were obtained. The yield was 98%.

EXAMPLE 8

A mixture of 12 g (0.1 mole) of tetramethyldisilane, 21.6 g (0.2 mole) of benzyl alcohol and 90 mg (0.0001 mole; 0.1 mole %) of tris (triphenylphosphine) chlororhodium was stirred at room temperature for 1 hour in the reactor of Example 1. The reaction mixture was distilled whereby 30.4 g of dimethylbenzyloxysilane having a boiling point of 55°C/5 mmHg were obtained. The yield was 94%.

EXAMPLE 9

A mixture of 19.0 g (0.1 mole) of bis (trimethylsilyl) methylmonohydrosilane, 18.4 g (0.4 mole) of ethanol and 90 mg (0.0001 mole; 0.1 mole %) of tris (triphenylphosphine) chlororhodium was stirred at 50°C for 3 hours in the reactor of Example 1. The reaction product was distilled whereby 20.5 g of trimethylethoxysilane having a boiling point of 75°C (yield 87%) and 11.4 g of methyldiethoxysilane having a boiling point of 95°C (yield 85%) were obtained.

EXAMPLE 10

A mixture of 12 g (0.1 mole) of symmetrical tetramethyldisilane and 6.4 g (0.2 mole) of methanol was admixed with 70 mg of tris (tri-n-butylphosphine) chlororhodium in the reactor of Example 1. The mixture was stirred and reacted at room temperature. The reaction product was distilled whereby 16.8 g of dimethylmethoxysilane having a boiling point of 36°C were obtained. The yield was 94%.

EXAMPLE 11

The process of Example 10 was followed except that tris (trimethylphosphite) chlororhodium was used as the catalyst. As a result, 14.3 of dimethylmethoxysilane was obtained. The yield was 80%.

EXAMPLE 12

A mixture of 12 g (0.1 mole) of symmetrical tetramethyldisilane and 16 g (0.5 mole) of methanol was admixed with 100mg of tris (diethylaminophosphine) chlororhodium in the reactor of Example 1. The mixture was stirred at 50°C for 3 hours. The reaction product was distilled whereby 20.0 g of dimethyldimethoxysilane having a boiling point of 80.5°C were obtained. The yield was 82%.

EXAMPLE 13

A mixture of 18 g (0.05 mole) of 1,2,3-trimethyl-1,2,3-triphenyl trisilane and 4.8 g (0.15 mole) of methanol was admixed with 24 mg (0.00005 mole; 0.1 mole%) of bis (1,5-hexadiene) dichlorodirhodium. The mixture was stirred and reacted at 50°C for 3 hours. The reaction product was distilled whereby 20.8 g of phenylmethylmethoxysilane having a boiling point of 81°C/11 mmHg were obtained. The yield was 91%.

EXAMPLE 14

A mixture of 17.6 g (0.1 mole) of 1,1,2,2,3,3-hexamethyl-trisilane, 18.0 g (0.3 mole) of isopropyl alcohol and 70 mg of tris (tri-n-butylphosphine) chlororhodium was stirred at room temperature for 2 hours in the reactor of Example 1. The reaction product was distilled whereby 31.9 g of dimethylisoproxysilane having a boiling point of 62°C were obtained. the yield was 90%.

EXAMPLE 15

A mixture of 17.6 g (0.1 mole) of 1,1,2,2,3,3-hexamethyltrisilane, 28.2 g (0.3 mole) of phenol and 90 mg of bis (triphenylphosphine) carbonylchlororhodium was stirred at 50°C for 3 hours in the reactor of Example 1. The reaction product was distilled whereby 37.9 g of dimethylphenoxysilane having a boiling point of 73.5°C/32 mmHg were obtained. The yield was 83%.

EXAMPLE 16

A mixture of 13.2 g (0.1 mole) of pentamethyldisilane and 9.2 g (0.2 mole) of ethanol was admixed with 50 mg of tetraethylene dichlorodirhodium. The mixture was stirred at room temperature for 3 hours in the reactor of Example 1. The reaction products were distilled whereby 9.7 g of dimethylethoxysilane having a boiling point 51°C (yield 93%) and 10.3 g of trimethylethoxysilane having a boiling point of 75°C (yield 88%) were obtained.

EXAMPLE 17

A mixture of 17.6 g (0.1 mole) of 1,1,2,2,3,3-hexamethyltrisilane 32 g (1 mole) of methanol, and 70 mg of tris (tri-n-butyl-phosphine) chlororhodium was stirred at room temperature for 2 hours in the reactor of Example 1. The reaction product was distilled whereby 33.5 g of dimethyldimethoxysilane having a boiling point of 81°C were obtained. The yield was 93%.

EXAMPLE 18

A mixture of 12 g (0.1 mole) of tetramethyldisilane, 21.6 g (0.2 mole) of benzylalcohol and 90 mg of dichlorodicarbonyldirhodium was stirred at 80°C for 5 hours in the reactor of Example 1. The reaction product was distilled whereby 24.3 g of dimethylbenzyloxysilane having a boiling point of 55°C/5mmHg were obtained. The yield was 75%.

Having fully described the invention, it will be apparent to one of ordinary skill in the art that many changes and modifications can be made thereto without departing from the spirit or scope of the invention as set forth herein.

What is claimed as new and intended to be covered by Letters Patent of the United States is:

1. A process for producing hydrogen-substituted alkoxy monosilane which comprises:

A. reacting (1) a polysilane of the formula

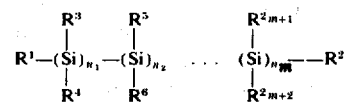

in which all R's may be the same or different and is selected from the group consisting of hydrogen, alkyl, alkenyl, aralkyl, aryl, silyl and alkoxy, and $n_m$ is an integer and $m$ is a natural number wherein the sum $n_1 \ldots n_m$ is at least 2, with (2) an alcohol of the formula ROH in which R is an alkyl radical selected from the group consisting of methyl, ethyl, isopropyl, n-propyl, n-butyl and benzyl, B. heating the resulting mixture to a temperature of at least 25°C in the presence of (3) a catalytically effective amount of an organorhodium coordination complex in which the rhodium portion is coordinated to a ligand selected from the group consisting of phosphine ligands, phosphite ligands, aminophosphine ligands, carbonyl ligands, carbonyl phosphine ligands, olefin ligands and diene ligands, C. recovering the corresponding alkoxysilane.

2. The process of claim 1, wherein the polysilane is disilane, trisilane or tetrasilane which is prepared by the hydrogenation of a residue obtained from the preparation of dimethyldichlorosilane.

3. The process of claim 1, wherein a stoichiometric amount or excess of the alcohol is added to the polysilane and reacted at a temperature from room temperature to the boiling point of the alcohol.

4. The process of claim 1 wherein said alcohol is ethanol.

5. The process of claim 1, wherein said alcohol is methanol.

6. The process of claim 1, wherein said alcohol is isopropyl alcohol.

7. The process of claim 1, wherein said alcohol is benzyl alcohol.

8. The process of claim 1, wherein the rhodium complex is tris (triphenylphosphine) chlororhodium.

9. The process of claim 1, wherein the rhodium complex is tris (trialkylphosphine) chlororhodium, tris (triarylphosphine) chlororhodium, tris (dialkylaryl-phosphine) chlororhodium, tris (alkyldiarylphosphine) chlororhodium, tris (trialkylphosphite chlororhodium, tris (triarylphosphite) chlororhodium, tris (dialkylaminophosphine) chlororhodium, bis (triarylphosphine) carbonylchlororhodium, bis (trialkylphosphine) carbonylchlororhodium, bis (trialkylphosphite) carbonylchlororhodium, tetraethylenedichlorodirhodium, bis (1,5-hexadiene) dichlorodirhodium, bis (cyclooctadiene) dichlorodirhodium, or dichlorodicarbonyldirhodium.

10. The process of claim 1, wherein the catalytically effective amount of said rhodium complex ranges from 0.01 – 1.0 mole %.

11. The process for producing hydrogen-substituted phenoxy monosilanes which comprises:

A. reacting (1) a polysilane of the formula

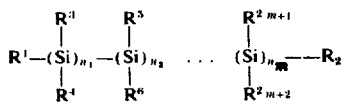

in which all R's may be the same or different and selected from the group consisting of hydrogen, alkyl, alkenyl, aralkyl, aryl, silyl or alkoxy, $n_m$ is an integer and $m$ is an integer, wherein the sum $n_1 \ldots n_m$ is at least 2, with (2) a phenolic compound.

B. heating the resulting mixture to at least 25°C in the presence of (3) a catalytically effective amount of an organorhodium coordination complex in which the rhodium portion is coordinated to a ligand selected from the group comprising phosphine ligands, phosphite ligands, aminophosphine ligands, carbonyl ligands, carbonyl phosphine ligands, olefin ligands and diene ligands, C. recovering the corresponding phenoxysilane.

12. The process of claim 11, wherein said phenolic compound is phenol.

13. The process of claim 11, wherein the polysilane is disilane, trisilane or tetrasilane which is prepared by the hydrogenation of a residue obtained from the preparation of dimethyldichlorosilane.

14. The process of claim 11, wherein a stoichiometric amount or excess of the phenol is added to the polysilane and reacted at a temperature from room temperature to the boiling point of the phenol.

15. The process of claim 11, wherein the rhodium complex is tris (triphenylphosphine)chlororhodium.

16. The process of claim 11, wherein the rhodium complex is tris(trialkylphosphine)chlororhodium, tris(triarylphosphine)chlororhodium, tris(dialkylarylphosphine)chlororhodium, tris(alkyldiarylphosphine)chlororhodium, tris(trialkylphosphite)chlororhodium, tris(triarylphosphite)chlororhodium, tris(dialkylaminophosphine)chlororhodium, bis(triarylphosphine) carbonylchlororhodium, bis(trialkylphosphine)carbonylchlororhodium, bis(trialkylphosphite)carbonylchlororhodium, tetraethylenedichlorodirhodium, bix(1,5-hexadiene)dichlorodirhodium, bis(cyclooctadiene)dichlorohodium, ro dichlorodicarbonyldirhodium.

17. The process of claim 11, wherein the catalytically effective amount of said rhodium complex ranges from 0.01 to 1.0 mole %.

* * * * *